(12) United States Patent
Inoue

(10) Patent No.: US 10,627,355 B2
(45) Date of Patent: Apr. 21, 2020

(54) ANALYSIS DEVICE

(71) Applicant: HORIBA, Ltd., Kyoto-shi, Kyoto (JP)

(72) Inventor: Takahito Inoue, Kyoto (JP)

(73) Assignee: HORIBA, LTD., Kyoto (JP)

(*) Notice: Subject to any disclaimer, the term of this patent is extended or adjusted under 35 U.S.C. 154(b) by 142 days.

(21) Appl. No.: 15/780,514

(22) PCT Filed: Dec. 7, 2016

(86) PCT No.: PCT/JP2016/086364
§ 371 (c)(1),
(2) Date: May 31, 2018

(87) PCT Pub. No.: WO2017/099120
PCT Pub. Date: Jun. 15, 2017

(65) Prior Publication Data
US 2018/0348153 A1 Dec. 6, 2018

(30) Foreign Application Priority Data
Dec. 7, 2015 (JP) ................ 2015-238773

(51) Int. Cl.
B01D 46/00 (2006.01)
B01D 46/42 (2006.01)
(Continued)

(52) U.S. Cl.
CPC .......... *G01N 25/385* (2013.01); *A47L 9/106* (2013.01); *B01D 46/4272* (2013.01);
(Continued)

(58) Field of Classification Search
CPC ......... A47L 9/106; B01D 45/06; B01D 46/00; B01D 46/12; B01D 46/42; B01D 46/4272;
(Continued)

(56) References Cited

U.S. PATENT DOCUMENTS 4,234,541 A 11/1980 Bredeweg et al.
5,110,554 A 5/1992 Tanimoto
(Continued)

FOREIGN PATENT DOCUMENTS

DE 4330782 A1 * 6/1994 ............. F23C 10/16
JP 2000266741 A * 9/2000
(Continued)

OTHER PUBLICATIONS

EPO, Extended European Search Report issued for corresponding European patent application No. 16873013.3, dated Jul. 11, 2019 (8 pages).
(Continued)

Primary Examiner — Nguyen Q. Ha
(74) Attorney, Agent, or Firm — Lucas & Mercanti, LLP

(57) ABSTRACT

In order to make it possible to remove dust produced in a heating furnace 10 more efficiently than ever before, the present invention is adapted to include: a dust discharge passage L that communicates with the inside of the heating furnace 10 and is for discharging dust produced by heating a sample X; a dust accommodating part 30 that accommodates the dust discharged from the dust discharge passage L; and a negative pressure generating mechanism 90 that is provided in the dust discharge passage L and generates negative pressure in the dust discharge passage, in which the negative pressure generated by the negative pressure generating mechanism 90 guides the dust from the heating furnace 10 to the dust discharge passage L.

6 Claims, 6 Drawing Sheets

(51) Int. Cl.
*G01N 31/12* (2006.01)
*G01N 25/38* (2006.01)
*F27D 17/00* (2006.01)
*F27B 17/02* (2006.01)
*F27B 14/06* (2006.01)
*A47L 9/10* (2006.01)
*B01D 45/06* (2006.01)
*B01D 46/12* (2006.01)
*F27B 5/16* (2006.01)

(52) U.S. Cl.
CPC ............ *F27B 14/061* (2013.01); *F27B 17/02* (2013.01); *F27D 17/001* (2013.01); *G01N 31/12* (2013.01); *B01D 45/06* (2013.01); *B01D 46/12* (2013.01); *F27B 5/16* (2013.01)

(58) Field of Classification Search
CPC ...... G01N 25/38; G01N 25/385; G01N 31/12; F27B 5/16; F27B 14/06; F27B 14/061; F27B 17/02; F27D 17/00; F27D 17/001
See application file for complete search history.

(56) References Cited

U.S. PATENT DOCUMENTS

| | | | |
|---|---|---|---|
| 9,682,859 B2* | 6/2017 | Brown | B01D 53/22 |
| 2012/0213244 A1 | 8/2012 | Latino et al. | |
| 2015/0033944 A1* | 2/2015 | Luven | B01D 45/12 |
| | | | 95/268 |
| 2016/0231298 A1 | 8/2016 | Hirata | |
| 2016/0266018 A1 | 9/2016 | Hirata et al. | |

FOREIGN PATENT DOCUMENTS

| | | |
|---|---|---|
| JP | 2000266741 A | 9/2000 |
| JP | 2010008229 A | 1/2010 |
| WO | 2015045869 A1 | 4/2015 |
| WO | 2015064631 A1 | 5/2015 |

OTHER PUBLICATIONS

International Search Report dated Feb. 21, 2017 for PCT/JP2016/086364 and English translation.

* cited by examiner

ANALYSIS DEVICE

CROSS REFERENCE TO RELATED APPLICATION

This Application is a 371 of PCT/JP2016/086364 filed on Dec. 7, 2016, which, in turn, claimed the priority of Japanese Patent Application No. JP 2015-238773 filed on Dec. 7, 2015, both applications are incorporated herein by reference.

TECHNICAL FIELD

The present invention relates to an analysis device such as an elemental analysis device that analyzes elements such as carbon (C) and sulfur (S) contained in a sample such as iron, steel, nonferrous metal, or ceramic.

BACKGROUND ART

As this sort of elemental analysis device, there is one adapted to place a crucible accommodating a sample in a heating furnace, apply high-frequency AC voltage to a coil provided around the crucible, heat and burn the sample in the crucible by high-frequency induction heating, and analyze elements contained in the sample from the resulting gas.

As disclosed in Patent Literature 1, the above-described elemental analysis device is configured to, because dust such as soot is produced by the burning of the sample and when the adsorption of the measurement gas on the dust occurs, an measurement error occurs, include a dust box and a dust suction mechanism provided on the downstream side of it, and suck the dust by the dust suction mechanism to discharge it to the dust box.

However, in the above-described configuration, since the dust suction mechanism exists on the downstream side of the dust box, the dust suction mechanism sucks the dust inside the heating furnace through the dust box, and the dust box acts as resistance to prevent the suction force of the dust suction mechanism from efficiently reach the heating furnace, probably resulting in the problem of being unable to sufficiently remove the dust.

CITATION LIST

Patent Literature

Patent Literature 1
  Japanese Unexamined Patent Publication JP-A2000-266741

SUMMARY OF INVENTION

Technical Problem

Therefore, the present invention has been made in order to solve the above-described problem, and a main object thereof is to make it possible to remove dust produced in a heating furnace more efficiently than ever before.

Solution to Problem

That is, an analysis device according the present invention heats a sample in a sample accommodating part and analyzes resulting sample gas, and includes: a dust discharge passage that communicates with the inside of the sample accommodating part and is for discharging dust produced by heating the sample; a dust accommodating part that accommodates the dust discharged from the dust discharge passage; and a negative pressure generating mechanism that is provided in the dust discharge passage and generates negative pressure in the dust discharge passage, in which the negative pressure generated by the negative pressure generating mechanism guides the dust from the sample accommodating part to the dust discharge passage.

In such an analysis device, since the negative pressure generating mechanism is provided in the dust discharge passage and arranged between the sample accommodating part and the dust accommodating part, suction force due to the negative pressure generated by the negative pressure generating mechanism reaches the sample accommodating part without the dust accommodating part, and the dust in the sample accommodating part can be removed more efficiently than ever before.

Specific embodiments of the negative pressure generating mechanism include one in which a body having; a through-hole forming a part of the dust discharge passage; and a gas supply passage for supplying gas to the through-hole are included, and the gas is configured to flow through the through-hole from a sample accommodating part side toward a dust accommodating part side, and generate the negative pressure on the sample accommodating side of the through-hole.

In order to remove the dust using the suction force due to the negative pressure more efficiently, it is preferable that the negative pressure generating mechanism is arranged at an end part on the sample accommodating part side in the dust discharge passage.

Note that, for example, when attempting to blow gas from an opening provided in the heating furnace to send the dust in the heating furnace to the dust discharge passage, the gas is blown into the heating furnace through the opening from a predetermined direction, and the flow of the gas deviates in the heating surface, causing part of the dust to accumulate in the heating furnace.

Therefore, it is preferable that the gas supply passage is formed of: an inclined groove that is opened in such a manner as to circle along an inner circumferential surface forming the through-hole and whose depth direction is set to a direction from the dust accommodating part side toward the sample accommodating side with increasing distance from the through-hole; and a communication hole whose one end is opened in the inclined groove and whose other end is formed in the outer circumferential surface of the body, and the communication hole is inclined with respect to the depth direction.

Such a configuration allows the gas flowing into the inclined groove from the communication hole to flow toward the opening while circling through the inclined groove and flow out to the through-hole from the entire circumference of the inner circumferential surface. This allows the flow of the gas flowing through the through-hole from the sample accommodating part side toward the dust accommodating part side to be less likely to deviate, making it possible to more surely guide the dust in the sample accommodating part to the dust discharge passage.

Specific embodiments include one in which: the body includes a first element arranged on the sample accommodating part side and a second element arranged on the dust accommodating part side; the first element and the second element are formed with the through-hole and include contact surfaces to be brought into contact with each other; the first element further includes, on an inner side of the contact surface, a protrusion part protruding toward the second element; the second element is, on an inner side of the contact surface, formed with a recess part recessed toward a side opposite to the first element; in a state where the contact surfaces of the first element and the second element are in contact with each other, the protrusion part is fitted into the recess part, and the inclined groove is formed between the outer circumferential surface of the protrusion part and the inner circumferential surface of the recess part; and the communication hole is formed penetrating through a circumferential wall part of the first element or the second element.

Such a configuration makes it possible to easily form the inclined groove and the communication hole by combining the first element and the second element in opposition to each other.

It is preferable that the side closer to the dust accommodating part than the joint part between the through-hole and the gas supply passage in the dust discharge passage is configured to be closable; and the dust discharge passage is closed, and thereby the gas supplied from the gas supply passage flows from the dust accommodating part side to the sample accommodating part side and flows into the sample accommodating part.

Such a configuration makes it possible for the gas supplied from the gas supply passage and flowing into the sample accommodating part to guide the sample gas to, for example, an analyzer positioned above the sample accommodating part by closing the dust discharge passage at the time of analysis.

That is, by closing or opening the dust discharge passage, the gas supplied from the gas supply passage can be used as both cleaning gas for removing the dust in the sample accommodating part and carrier gas for guiding the sample gas to the analyzer.

In order to make it possible to switch the gas to an appropriate type between cleaning and analysis, it is preferable to further include a gas species switching mechanism adapted to switch the gas to be supplied from the gas supply passage to the through-hole to inflammable gas or non-flammable gas.

Advantageous Effects of Invention

According to the present invention configured as described above, the dust produced in the sample accommodating part can be removed more efficiently than ever before.

REFERENCE SIGNS LIST

100 Analysis device
X Sample
10 Heating surface (sample accommodating part)
L Dust discharge passage
30 Dust accommodating part
90 Negative pressure generating mechanism
9S Through-hole
9L Gas supply passage
B Body
91 First element
92 Second element

DESCRIPTION OF EMBODIMENTS

In the following, one embodiment of the analysis device according to the present invention will be described with reference to the drawings.

An analysis device 100 according to the present invention is an elemental analysis device that heats a sample X such as iron, steel, nonferrous metal, or ceramic to burn it, and from the resulting sample gas, analyzes elements such as carbon (C) and sulfur (S) contained in the sample X.

Figure 1:
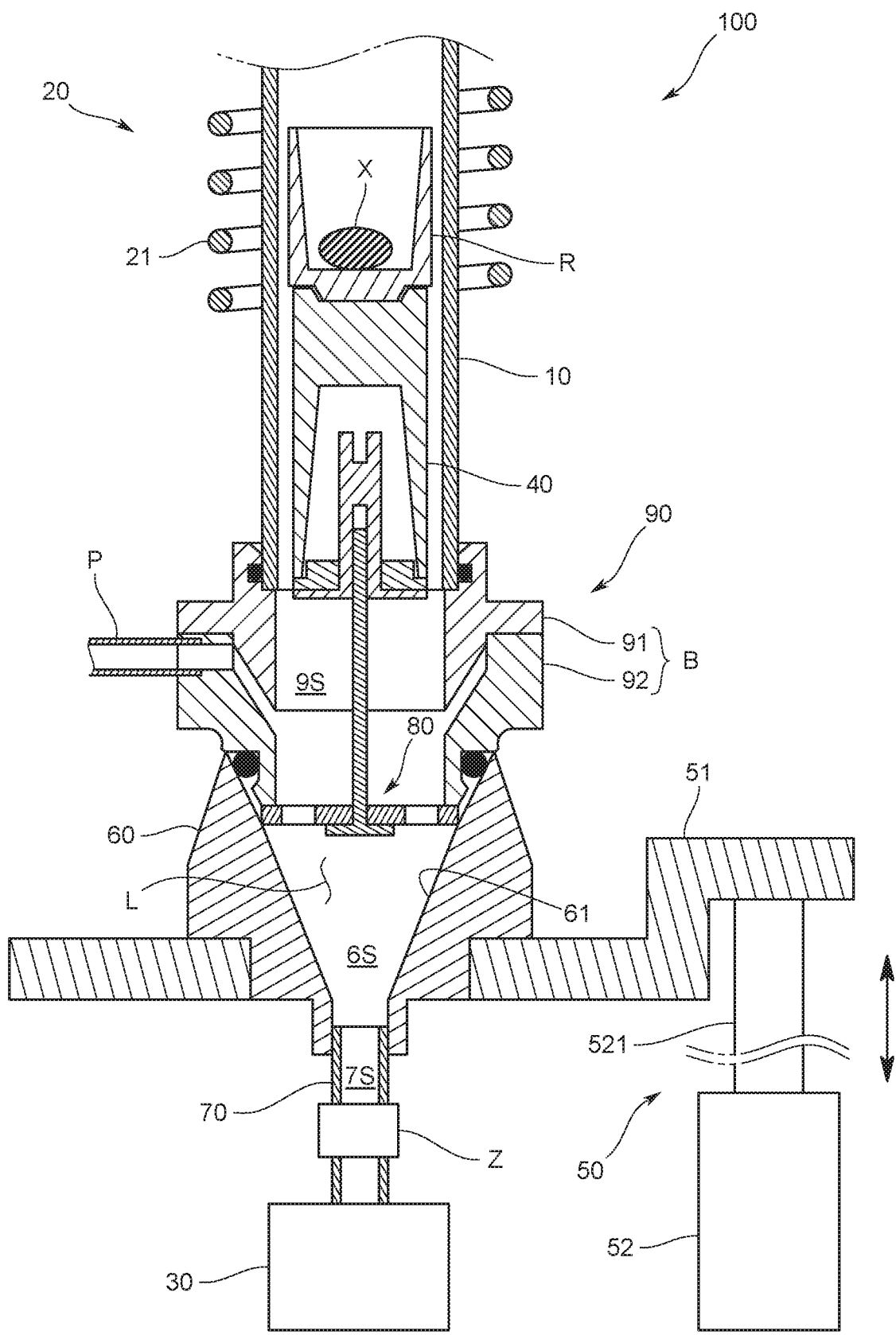
FIG. 1 is a diagram schematically illustrating a configuration of an analysis device in the present embodiment.

Specifically, as illustrated in FIG. 1, this one includes: a heating furnace 10 as a sample accommodating part in which a crucible R accommodating the sample X is placed; a heating mechanism 20 for heating the sample X; an unillustrated gas analyzer for analyzing the sample gas produced by heating and burning the sample X; a dust discharge passage L for discharging dust produced by burning the sample X out of the heating furnace 10; and a dust accommodating part 30 for accommodating the dust discharged from the dust discharge passage L.

The heating furnace 10 is configured to burn the sample X inside and guide the resulting sample gas to the unillustrated gas analyzer, and as illustrated in FIG. 1, formed in a tubular shape, such as a substantially cylindrical shape, whose lower end is opened and whose upper part is formed with an unillustrated gas lead-out port for guiding the sample gas to the gas analyzer.

In the heating furnace 10, the crucible R made of a magnetic material such as ceramic, or graphite is accommodated, and here the crucible R is attached on a placing table 40 that moves up and down along the tube axis direction of the heating furnace 10.

The placing table 40 is configured to be moved up and down by a below-describe moving up and down mechanism 50 between a heating position where the sample X in the crucible R is heated in the heating furnace 10 and an attachment/detachment position where the crucible R is positioned outside the heating furnace 10 and attached/detached with respect to the placing table 40.

The heating mechanism 20 is an induction current generating mechanism adapted to generate induced current in the sample X accommodated in the crucible R by high-frequency induction heating, and specifically one including a coil 21 and an unillustrated power supply for applying high-frequency AC voltage to the coil 21. The coil 21 is provided along the circumferential wall of the hearing furnace 10, and the height of the placing table 40 is set so that when the high-frequency AC voltage is applied to the coil 21, the crucible R is positioned inside the coil 21. In addition, when the high-frequency AC voltage is applied to the coil 21, the crucible R generates heat by the high-frequency induction heating and the sample X in the crucible R is heated.

The unillustrated gas analyzer analyzes the sample gas guided to the gas analyzer to obtain the content of each component contained in the sample X, and, in the present embodiment, performs the analysis using, for example, a non-dispersive infrared absorption method (NDIR method). Specifically, the gas analyzer includes an unillustrated non-dispersive infrared detector, and obtains the contents of carbon (C), sulfur (S), and the like contained in the sample X by detecting $CO_2$, CO, $SO_2$, and the like contained in the sample gas.

The dust discharge passage L discharges dust produced in the heating furnace 10 to the dust accommodating part 30, and as illustrated in FIG. 1, one end communicates with the lower end opening of the heating furnace 10 and the other end is connected to the dust accommodating part 30.

In the present embodiment, a part of the dust discharge passage L is formed of: an internal space 6S formed penetrating through a block body 60 positioned below the heating furnace 10; and an internal flow passage 7S of a tubing member 70 connecting between the block body 60 and the dust accommodating part 30.

At least a part of an inner circumferential surface 61 of the block body 60 forming the internal space 6S is formed in an inverted truncated conical shape whose diameter gradually reduces in a downward direction, and the internal space 6S is formed in a rotating body shape. And the block body 60 is arranged such that the rotation axis of the internal space 6S coincides with the tube axis of the heating furnace 10.

Such a configuration can make the flow of gas from the heating furnace 10 side toward the dust accommodating part 30 side in the internal space 6S less likely to be disturbed.

In the present embodiment, one end part is fitted into the internal space 6S of the block body 60 without backlash, whereas the other end part is provided with a connecting member 80 attached to the placing table 40, and the connecting member 80 allows the moving up and down mechanism 50 to be configured to move up and down the block body 60 and the placing table 40 integrally.

The moving up and down mechanism 50 includes: a support part 51 adapted to support the block body 60; and a drive part 52 adapted to move up and down the support part 51 along the vertical direction, and the drive part 52 is configured to move up and down the support part 51 in a position horizontally offset from the block body 60.

Specifically, the shaft member 521 supporting the support part 51 is configured to be moved up and down by a cylinder, and when viewed vertically from below, the shaft member 521 is arranged horizontally separately so as to prevent overlap with at least the heating furnace 10 and the dust discharge passage L.

In doing so, as described above, the dust accommodating part 30 can be arranged vertically below the heating furnace 10 and the block body 60.

The tubing member 70 is such that one end is connected to the lower end part of the block body 60 and the other end is connected to the dust accommodating part 30, and the internal flow passage 7S of the tubing member 70 forms the downstream side of the dust discharge passage L.

Specifically, the tubing member 70 is formed in an elastic straight tube shape formed of resin or the like, and for example, a silicon tube such as a Fluran tube.

The dust accommodating part 30 has a filter or the like for capturing the dust, and is configured such that air flowing through the dust discharge passage flows outside with little interruption.

In addition, as illustrated in FIG. 1, the analysis device 100 of the present embodiment further includes a negative pressure generating mechanism 90 that is provided in the above-described dust discharge passage L and generates negative pressure in the dust discharge passage L, and is configured so that the negative pressure generated by the negative pressure generating mechanism 90 guides the dust from the heating furnace 10 to the dust discharge passage L. In other words, the negative pressure generating mechanism 90 adapts to make the upstream side of the negative pressure generating mechanism 90 in the dust discharge passage L lower in pressure than the inside of the heating furnace 10. As a result, the gas inside the heating furnace 10 flows into the dust discharge passage L, and the dust in the heating furnace 10 is guided to the dust discharge passage L while being caught in the flow of the gas.

In the present embodiment, the negative pressure generating mechanism 90 is arranged at an end part on the heating furnace 10 side in the dust discharge passage L, and provided directly below the heating furnace 10.

Figure 2:
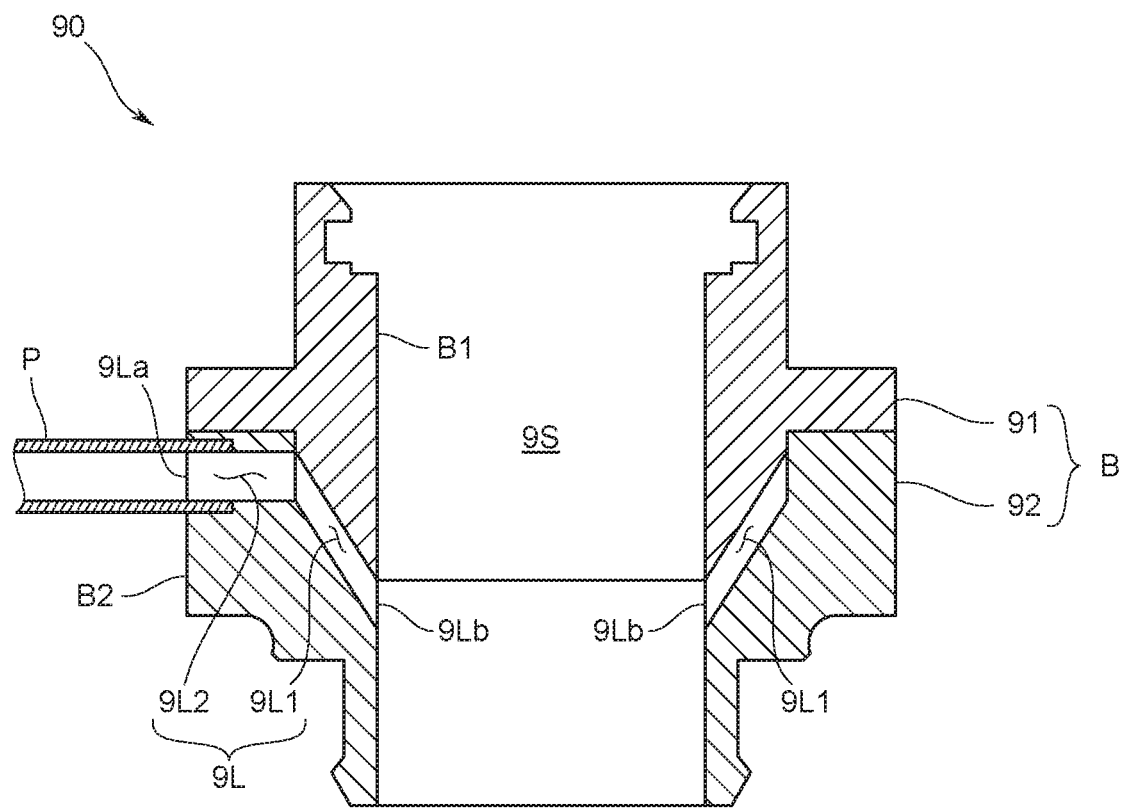
FIG. 2 is a diagram schematically illustrating a configuration of a negative pressure generating mechanism in the same embodiment.
Figure 3:
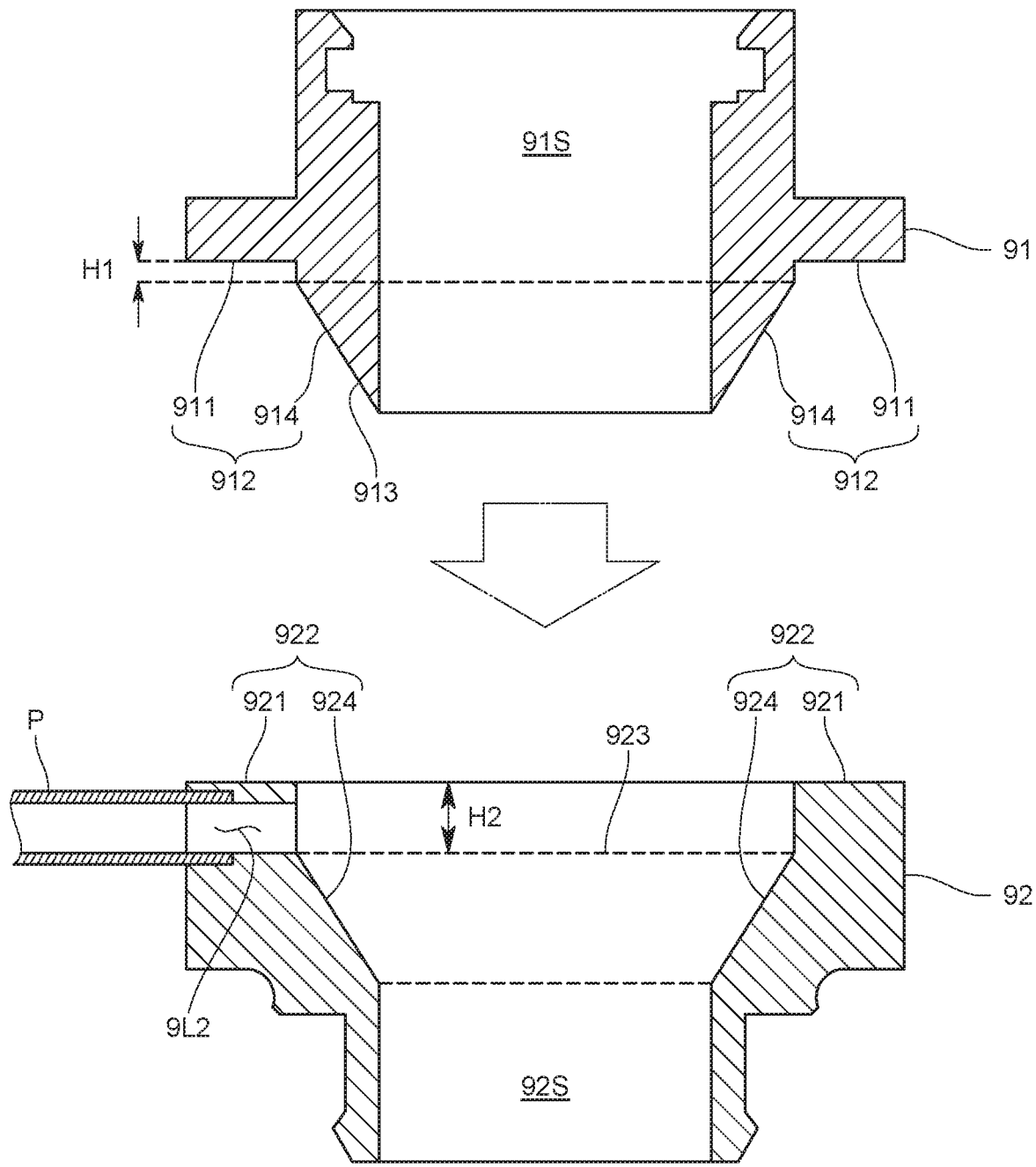
FIG. 3 is a diagram schematically illustrating the configuration of the negative pressure generating mechanism in the same embodiment.

Specifically, as illustrated in FIG. 2 and FIG. 3, the negative pressure generating mechanism 90 includes a body B having; a through-hole 9S forming a part of the dust discharge passage L; and a gas supply passage 9L for supplying gas to the through-hole 9S, and is configured to generate the negative pressure on the heating furnace 10 side of the through-hole 9S in such a manner that the gas flows through the through-hole 9S from the heating furnace 10 side to the dust accommodating part 30 side, i.e., utilizes a so-called ejector action (ejector mechanism). That is, the direction of the gas flowing through the gas supply passage 9L has a directional component from the heating furnace 10 toward the dust accommodating part 30 at least just before the supply to the through-hole 9S, and this generates the above-described negative pressure. Here, as illustrated in FIG. 1, the body B is fit at the outside of the lower end part of the heating furnace 10 via a seal member such as an O-ring, as well as is fit into the upper end part of the block body 60 via a seal member such as an O-ring, and the through-hole 9S forms the upstream side (heating furnace 10 side) of the dust discharge passage L.

The gas supply passage 9L supplies the gas for cleaning to the through-hole 9S when cleaning the dust in the heating furnace 10, and configured such that the gas from an unillustrated gas source flows into one end opening 9La and the gas flows out to the through-hole 9S from the other end opening 9Lb.

Specifically, as illustrated in FIG. 2, the gas supply passage 9L has: an inclined groove 9L1 that is opened in such a manner as to circle along the entire circumference of the body's B inner circumferential surface B1 forming the through-hole 9S and whose depth direction is set to a direction from the dust accommodating part 30 side to the heating furnace 10 side with increasing distance from the through-hole 9S; and a communication hole 9L2 whose one end is opened in the inclined groove 9L1 and whose other end is opened in the outer circumferential surface B2 of the body B.

Note that the depth direction herein refers to a direction from the one end opening 9La to the connecting point between the inclined groove 9L1 and the communication hole 9L2.

In the present embodiment, as illustrated in FIG. 2 and FIG. 3, the body B includes a first element 91 arranged on the heating furnace 10 side and a second element 92 arranged on the dust accommodating part 30 side.

The first element 91 and the second element 92 are formed with through-holes 91S and 92S (hereinafter referred to as a first element through-hole 91 and a second element through-hole 92S), and have contact surfaces 911 and 921 (hereinafter referred to as a first element side contact surface 911 and a second element side contact surface 921) that are to be brought into contact in opposition to each other. In addition, as illustrated in FIG. 2, the through-hole 9S and the gas supply passage 9L are adapted to be formed by bringing the first element side contact surface 911 and the second element side contact surface 921 into contact with each other to combine the first element 91 and the second element 92.

To describe more specifically, as illustrated in FIG. 3, the first element 91 is such that the outer part of a first element side opposite surface 912 opposite to the second element 92 is formed as the first element side contact surface 911, and on the inner side of the first element side contact surface 911, a protrusion part 913 protruding toward the second element 92 is provided.

The protrusion part 913 is formed in a truncated conical shape whose diameter gradually reduces from the base end to the fore end and whose circumferential surface 914, i.e., the inner part of the first element side opposite surface 912 is inclined in such a manner as to come closer to the first element through-hole 91S from the base end toward the fore end.

In the present embodiment, the base end of the protrusion part 913 is provided separated from the first element side contact surface 911 toward the second element 92 side by a predetermined first distance H1.

In addition, the first element through-hole 91S is formed in a rotating body shape, and the first element 91 is formed in a rotating body shape rotated around the rotation axis of the first element through-hole 91S, such as a tubular shape.

As illustrated in FIG. 3, the second element 92 is such that the outer part of a second element side opposite surface 922 opposite to the first element 91 is formed as the second element side contact surface 921, and on the inner side of the second element side contact surface 921, a recess part 923 recessed toward the side opposite to the first element 91 is formed.

The recess part 923 is formed in a truncated conical shape whose diameter gradually reduces from the first element 91 side toward the side opposite to it and forms a part of the second element through-hole 92S. An inner circumferential surface 924 forming the recess part 923, i.e., the inner part of the second element side opposite surface 922 is inclined in such a manner as to come closer to the second element through-hole 92S from the first element 91 side toward the side opposite to it.

In the present embodiment, an opening of the recess part 923 on the first element 91 side is provided separated from the second element side contact surface 921 toward the side opposite to the first element 91 by a second distance H2 longer than the first distance H1.

In addition, the second element through-hole is formed in a rotating body shape, and the second element 92 is formed in a rotating body shape rotated around the rotation axis of the second element through-hole 92S, such as a tubular shape.

In the above-described configuration, since the second distance H2 is longer than the first distance H1, by fitting the protrusion part 913 of the first element 91 into the recess part 923 of the second element 92, the first element side contact surface 911 and the second element side contact surface 921 come into contact with each other, and also between the outer circumferential surface 914 of the protrusion part 913 and the inner circumferential surface 924 forming the recess part 923, i.e., between the outer part of the first element side opposite surface 912 and the inner part of the second element side opposite surface 922, a gap corresponding to the difference between the first distance H1 and the second distance H2 is formed and serves as the above-described inclined groove 9L1.

Note that the present embodiment is adapted to form the inclined groove 9L1 by separating the outer circumferential surface 914 of the protrusion part 913 and the inner circumferential surface 924 forming the recess part 923 in a parallel state; however, the shape of the inclined groove 9L1 may be appropriately changed.

On the other hand, the communication hole 9L2 communicating with the inclined groove 9L1 is formed penetrating through the circumferential wall part of the first element 91 or the second element 92 in the radial direction (direction orthogonal to the central axis), and here, connected to the upstream side end part of the inclined groove 9L1, penetrating through the upper part of the circumferential wall part of the second element 92. That is, the communication hole 9L2 is connected to one circumferential point of the bottom of the inclined groove 9L1.

In addition, the communication hole 9L2 is inserted with an introduction tube P for introducing the gas from the unillustrated gas source into the communication hole 9L2.

Further, by bringing the first element side contact surface 911 and the second element side contact surface 921 into contact with each other, the first element through-hole 91S and the second element through-hole 92S communicate to form the through-hole 9S.

The present embodiment is configured such that the central axis of the first element through-hole 91S and the central axis of the second element through-hole 92S coincide, and the through-hole 9S is formed in a substantially columnar shape.

In the negative pressure generating mechanism 90 configured as described, when flowing the gas from the unillustrated gas source into the gas supply passage 9L, the gas flows toward the through-hole 9S while circling through the inclined groove 9L1, and flows out to the through-hole 9S from the entire circumference of the inner circumferential surface B1 of the body B. Then, the gas flows through the through-hole 9S from the heating furnace 10 side to the dust accommodating part 30 side, and therefore the negative pressure is generated on the side closer to the heating furnace 10 than the joint part between the gas supply passage 9L and the through-hole 9S in the dust discharge passage L.

Note that in the present embodiment, the side closer to the dust accommodating part 30 than the above-described joint part between the through-hole 9S and the gas supply passage 9L in the dust discharge passage L is configured to be closable.

More specifically, as illustrated in FIG. 1, the tubing member 70 forming a part of the dust discharge passage L is provided with an open/close mechanism Z adapted to open/close the tubing member 70.

The open/close mechanism Z uses, for example, a pinch valve, and is configured to switch the dust discharge passage L from an opened state to a closed state by squashing a silicon tube as the tubing member 70.

Figure 4:
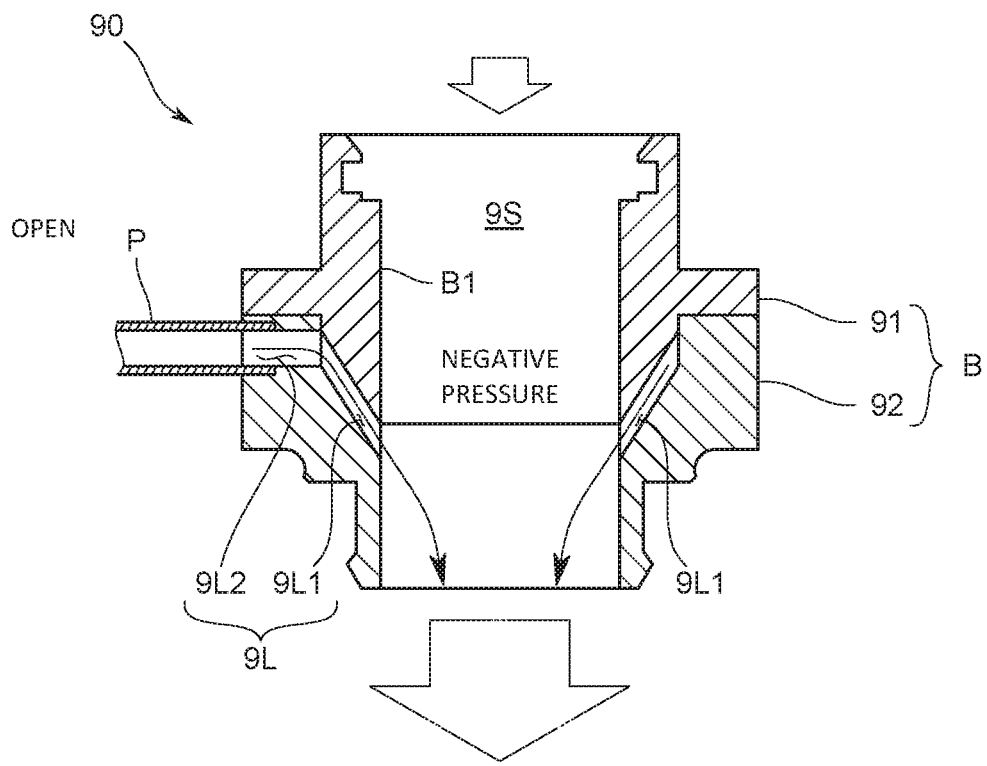
FIG. 4 is a diagram for explaining the flow of gas in the same embodiment.
Figure 4:
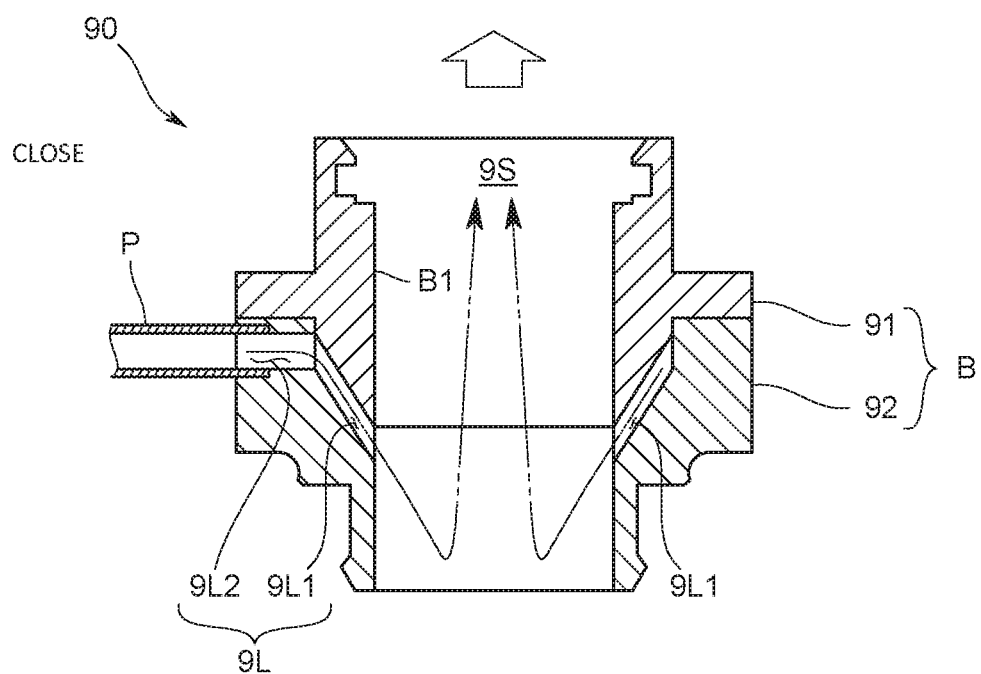

Such a configuration allows, when bringing the dust discharge passage L into the opened state, as illustrated in the upper portion of FIG. 4, the negative pressure generating mechanism 90 to generate the negative pressure, and when bringing the dust discharge passage L into the closed state, as illustrated in the lower portion of FIG. 4, the gas supplied from the gas supply passage 9L to the through-hole 9S to flow from the dust accommodating part 30 side to the heating furnace 10 side and flow into the heating furnace 10.

Accordingly, by switching the dust discharge passage L to the closed state using the open/close mechanism Z when analyzing the sample X, the gas flowing from the dust discharge passage L into the heating furnace 10 guides the sample gas produced in the heating furnace 10 to the gas lead-out port formed on the upper side of the heating furnace 10.

That is, at the time of analysis, the gas supplied from the gas supply passage 9L to the through-hole 9S can be used as carrier gas for guiding the sample gas to the analyzer.

As the gas to be supplied to the through-hole 9S, non-flammable gas and inflammable gas are prepared, and the analysis device 100 of the present embodiment further includes an unillustrated gas species switching mechanism adapted to switch the gas to be supplied to the through-hole 9S to the non-flammable gas or the inflammable gas.

The gas species switching mechanism uses, for example, on/off valves or the like provided in flow passages for guiding the gases from gas sources to the gas supply passage 9L, and here, adapted such that at the time of cleaning to discharge the dust in the heating furnace 10, as cleaning gas, nitrogen which is the non-flammable gas flows into the gas supply passage 9L, and at the time of analysis, oxygen which is the inflammable gas flows into the gas supply passage 9L.

In the analysis device 100 according to the present embodiment configured as described, since the negative pressure generating mechanism 90 is provided at the end part on the heating furnace 10 side in the dust discharge passage L, suction force due to the negative pressure generated by the negative pressure generating mechanism 90 can be used with little pressure loss, and the dust in the heating furnace 10 can be removed more efficiently than ever before.

Also, since the gas flowed into the gas supply passage 9L is supplied to the through-hole 9S from the entire circumference of the inner circumferential surface B1, the flow of the gas flowing through the through-hole 9S from the heating furnace 10 side toward the dust accommodating part 30 side is less likely to deviate, and the dust in the heating furnace 10 can be more surely guided to the dust discharge passage L.

Further, since the through-hole 9S and the gas supply passage 9L can be formed by combining the first element and the second element in opposition to each other, the negative pressure generating mechanism 90 can be simply configured and manufactured at low cost.

In addition, by closing or opening the dust discharge passage L by the open/close mechanism Z, the gas supplied from the gas supply passage 9L to the through-hole 9S can be used as both the cleaning gas for removing the dust in the heating furnace 10 and the carrier gas for guiding the sample gas to the analyzer.

Further in addition, since the need for the suction mechanism provided on the downstream side of the conventional dust accommodating part 30 can be eliminated, the entire device can be reduced in size.

Note that the present invention is not limited to the above-described embodiment.

Figure 5:
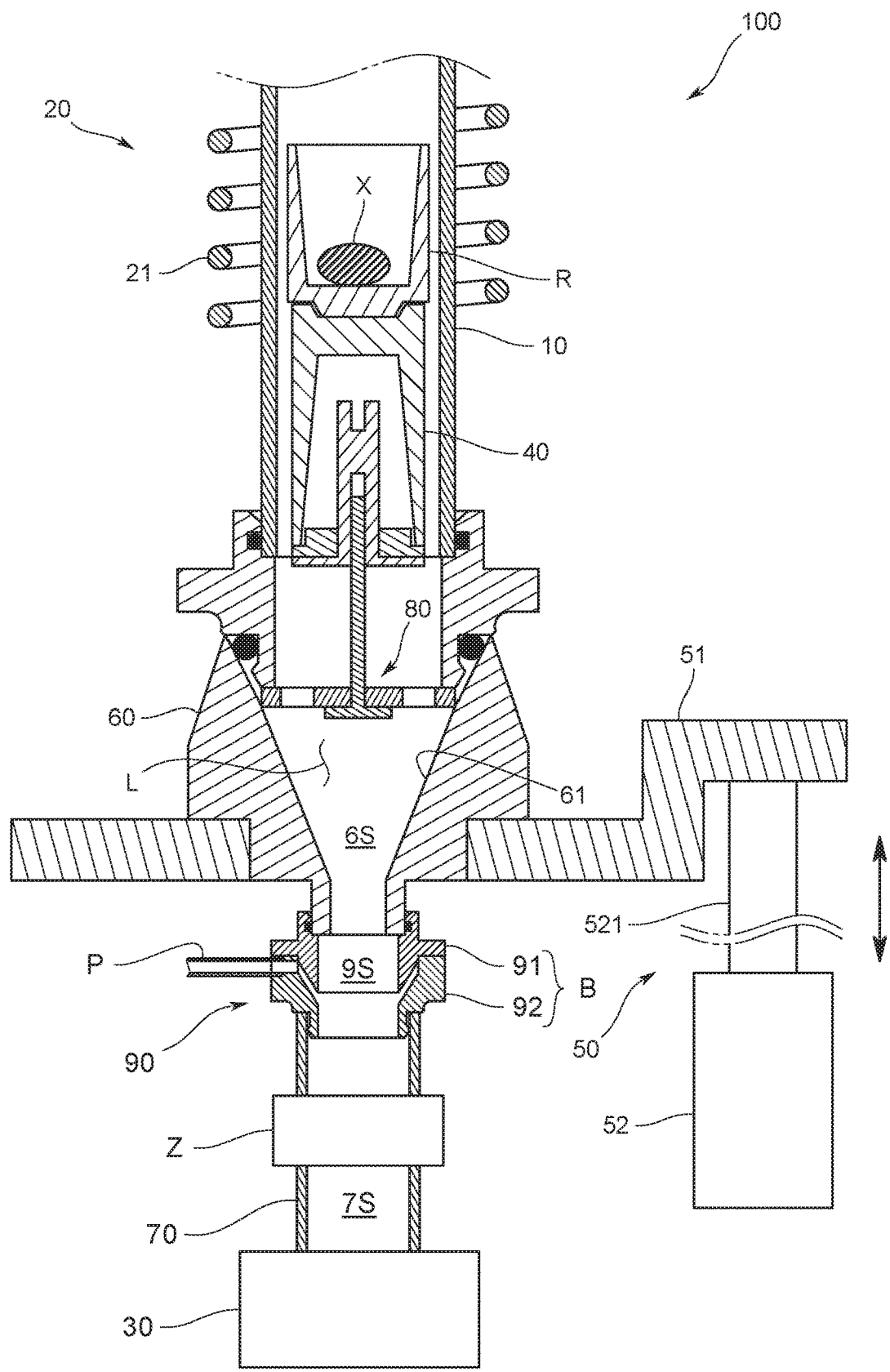
FIG. 5 is a diagram schematically illustrating a configuration of an analysis device in a variation.

For example, in the above-described embodiment, the negative pressure generating mechanism was arranged at the end part on the heating furnace side in the dust discharge passage L; however, the negative pressure generating mechanism only has to be provided between the heating furnace and the dust accommodating part, i.e., provided in the dust discharge passage, and for example, as illustrated in FIG. 5, may be provided between the block body 60 and the tubing member 70 or may be provided between a pair of tubing members although not illustrated.

Figure 6:
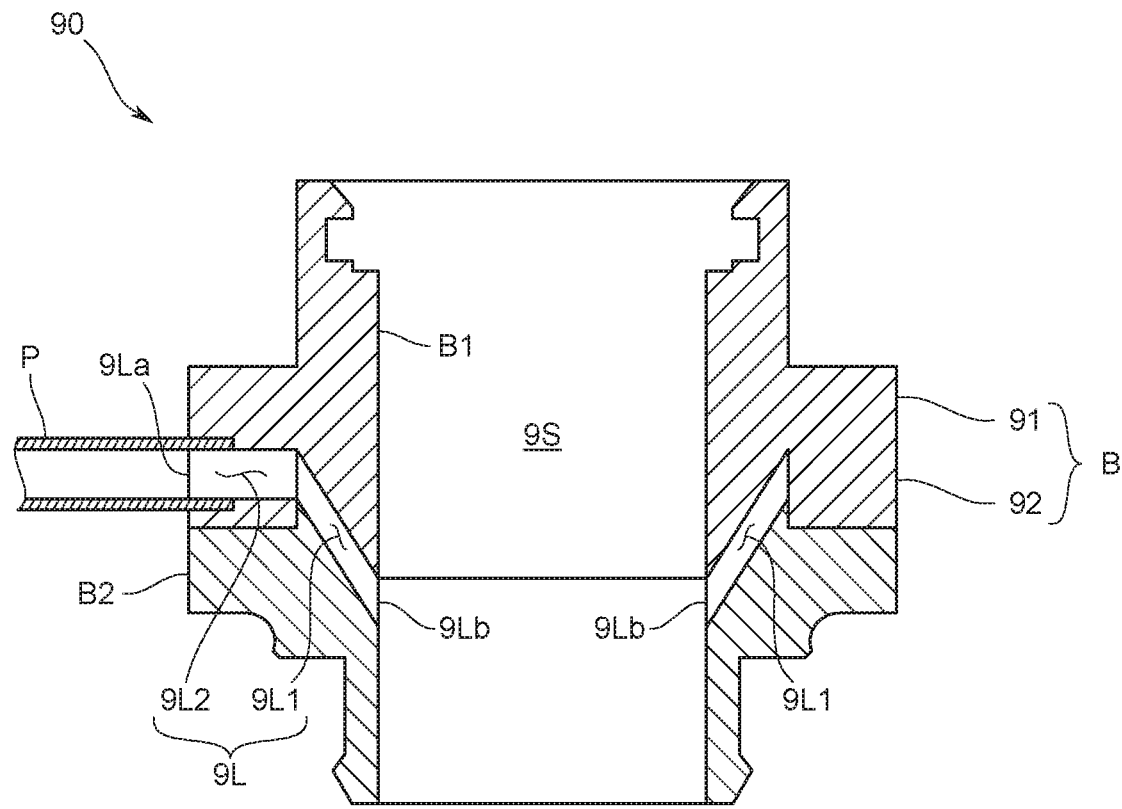
FIG. 6 is a diagram schematically illustrating a configuration of a negative pressure generating mechanism in a variation.

Also, in the negative pressure generating mechanism in the above-described embodiment, the second element was provided with the communication hole; however, as illustrated in FIG. 6, the first element 91 may be provided with the communication hole 9L2.

Further, the inclined groove in the above-described embodiment was opened in such a manner as to circle along the entire circumference of the inner circumferential surface of the body; however, the inclined groove may be opened in a part of the inner circumferential surface of the body.

In addition, the communication hole is not necessarily required to be connected to the bottom of the inclined groove or not necessarily required to be formed orthogonal to the central axis of the through-hole. Also, multiple communication holes may be formed, and in this case, the respective holes only have to be connected to mutually different parts of the inclined groove (e.g., parts point-symmetric with the central axis of the through-hole as the center).

Further, the open/close mechanism in the above-described embodiment was configured to squash the silicon tube as the tubing member using the pinch valve, but may be configured to close the side closer to the dust accommodating part than the joint part with the gas supply passage in the through-hole of the negative pressure generating mechanism.

Note that the dust discharge passage L is not necessarily required to be closable, and the analysis device does not have to include the open/close mechanism.

In addition, the heating mechanism in the above-described embodiment was of the high-frequency induction heating type; however, for example, with the sample accommodated in the graphite crucible, as the heating mechanism, one of an electrical heating type adapted to electrically heating the crucible may be used.

Besides, it goes without saying that the present invention is not limited to the above-described embodiment, but can be variously modified without departing from the scope thereof.

INDUSTRIAL APPLICABILITY

According to the present invention, the dust produced in the sample accommodating part can be removed more efficiently than ever before.

The invention claimed is:

1. An analysis device that is configured to heat a sample in a sample accommodating part and analyze resulting sample gas, the analysis device comprising:
a dust discharge passage that communicates with an inside of the sample accommodating part and discharges dust produced by heating the sample;
a dust accommodating part that accommodates the dust discharged from the dust discharge passage; and
a negative pressure generating mechanism that is provided in the dust discharge passage and generates negative pressure in the dust discharge passage, the negative pressure generating mechanism comprising a body having a through-hole forming a part of the dust discharge passage and a gas supply passage for supplying gas to the through-hole, wherein
the supplied gas flows through the through-hole from the sample accommodating part side of the dust discharge passage toward a dust accommodating part side of the dust discharge passage and generates a negative pressure in a sample accommodating part side of the dust discharge passage, and the negative pressure generated by the negative pressure generating mechanism guides the dust from the sample accommodating part to the dust discharge passage.

2. The analysis device according to claim 1, wherein the negative pressure generating mechanism is arranged at an end part on the sample accommodating part side in the dust discharge passage.

3. The analysis device according to claim 1, wherein the gas supply passage is formed of:
an inclined groove that is opened in such a manner as to circle along an inner circumferential surface forming the through-hole, wherein a depth direction of the inclined groove is set to a direction from the dust accommodating part side toward the sample accommodating side with increasing distance from the through-hole; and
a communication hole whose one end is opened in the inclined groove and whose other end is formed in an outer circumferential surface of the body, and
a depth direction of the communication hole is inclined with respect to the depth direction of the inclined groove.

4. The analysis device according to claim 3, wherein:
the body comprises a first element arranged on the sample accommodating part side and a second element arranged on the dust accommodating part side;
the first element and the second element are formed with the through-hole and include contact surfaces to be brought into contact with each other;
the first element further includes a protrusion part on an inner side of the contact surface, the protrusion part protruding toward the second element;
the second element is formed with a recess part on an inner side of the contact surface, the recess part being recessed toward a side opposite to the first element;
in a state where the contact surfaces of the first element and the second element are in contact with each other, the protrusion part is fitted into the recess part, and the inclined groove is formed between an outer circumferential surface of the protrusion part and an inner circumferential surface of the recess part; and
the communication hole is formed penetrating through a circumferential wall part of the first element or the second element.

5. The analysis device according to claim 1, wherein
a portion of the dust discharge passage closer to the dust accommodating part than a joint part between the through-hole and the gas supply passage in the dust discharge passage is configured to be closable, and
when the portion of the dust discharge passage is closed, and thereby the gas supplied from the gas supply passage flows from the dust accommodating part side to the sample accommodating part side and flows into the sample accommodating part.

6. The analysis device according to claim 1, further comprising
a gas species switching mechanism adapted to switch the gas to be supplied from the gas supply passage to the through-hole to inflammable gas or non-flammable gas.

* * * * *